United States Patent Office 3,005,786
Patented Oct. 24, 1961

3,005,786
PROCESS FOR SUSPENSION CONDENSATION OF EPIHALOHYDRIN ALKYLENEPOLYAMINE ANION RESINS
Albert H. Greer, Haddonfield, N.J., assignor to Pfaudler Permutit, Inc., New York, N.Y., a corporation of New York
No Drawing. Filed July 30, 1959, Ser. No. 830,479
9 Claims. (Cl. 260—2.1)

This application is a continuation-in-part of my copending applications, Serial No. 545,787, filed November 8, 1955, now Patent No. 2,898,309, issued August 4, 1959, and Serial No. 602,929, filed August 8, 1956, now Patent No. 2,898,310, issued August 4, 1959.

This invention relates to an improved process for producing anion exchange resins in the form of spheroidal particles or beads.

For some time a process has been available for producing anion exchange resins in bead form, by first producing an aqueous syrup of partially-condensed resin, such as a partially-condensed resin produced by condensing an epihalohydrin with an alkylenepolyamine, dispersing this aqueous syrup in an inert organic non-solvent liquid, and while agitating the dispersion, curing the partially-condensed resin by heating, with sufficient agitation being provided during heating so as to prevent coagulation of the dispersion. The resulting product is produced in the form of spheroidal particles or beads. During this process, it has been the practice to employ a surface-active agent to prevent agglomeration of the particles of anion exchange resin in the inert organic non-solvent suspending liquid while the resin particles or beads are being produced. Among the surface-active agents which have been employed are those of the inorganic type, represented by the clays or silicas, or organic surface-active agents of the anion, cation, and non-ionic type. One type of non-ionic surface-active agent employed is disclosed in U.S. Patent No. 2,610,156, which employs condensation products of long chain amides, alcohols and fatty acids with ethylene oxide. Non-ionic surface-active agents in accordance with that patent include alkylphenol-ethylene oxide condensation products, such as "Igepal," fatty acid ethylene oxide condensation products, such as "Emulphor," and polyoxyalkylene derivatives of hexitol anhydride partial long chain fatty acid esters, such as the "Tweens."

While production of ion exchange resin beads by this prior art process, using its surface-active agents, has been employed commercially, it has certain disadvantages. It has been found that after the aqueous syrup of partially-condensed resin is dispersed in the inert organic non-solvent liquid and the dispersed gel reaches the stage where the discrete particles begin to harden (referred to in the industry as "sticky point"), it is necessary to increase the stirrer or agitator speed previously set, in order to avoid agglomeration of the beads at that particular time and provide uniform bead size. In commercial production this is a decided disadvantage since it is necessary to determine exactly in each batch when the "sticky point" has been reached and the stirrer speed must be increased at the right moment in order to prevent agglomeration of the beads. Another important disadvantage in the use of the prior process, using the surface-active agents previously employed, has been the fact that these surface-active agents can be reused only a few times. This is caused by the high temperature of polymerization and curing which tends to destroy the surface-active agents of the prior art. Thus, in reusing the inert organic non-solvent liquids in subsequent batches, it is necessary to substantially replace the prior art surface active agents after only a few runs. A third and equally important disadvantage of the prior art processes has been the lack of uniformity in bead size.

It is, accordingly, an object of the present invention to produce anion exchange resins in the form of cured water-insoluble beads of substantially uniform particle size.

It is another object of the present invention to provide a process for preparing in the form of beads of substantially uniform size, an anion exchange resin which is a condensation product of an epihalohydrin with a polyalkylene polyamine.

It is another further object of the present invention to produce ion exchange resins in the form of uniform sized beads by dispersing an aqueous syrup of a partially-condensed resin in an inert organic non-solvent suspending liquid and maintaining the resulting dispersion with the aid of the dispersing agents of the present invention.

Other objects of the present invention will be apparent to those skilled in the art from reading the present specification.

The process of the present invention involves producing anion exchange resins in the form of substantially uniform-sized beads by first dispersing an aqueous syrup of a resinous partially-condensed product, which when fully condensed, provides a water-insoluble anion exchange resin, in an inert organic non-solvent suspending liquid by means of mechanical agitation and in the presence of one of the dispersing agents of the present invention, thereafter converting the resulting dispersed globules of partially-condensed product into insoluble resin beads by heating.

The process of the present invention finds application in providing beads of any anion exchange resin which may suitably be prepared from an aqueous syrup of partially-condensed resin, and which may thereafter be converted to beads by dispersing the aqueous syrup in an inert organic non-solvent suspending liquid by means of agitation and heating the resulting dispersion.

The dispersing agents of the present invention include polyvinyl chloride, chlorinated rubber, chlorosulfonated polyethylene and other halogenated long chain polymeric hydrocarbon compounds made up of halogenated repeating polyethylene, polybutadiene and polyisoprene moieties, preferably of at least about 500 repeating units and having a molecular weight of at least about 10,000. In these compounds, the halogen is attached either directly to a carbon linkage or to a sulfur atom which is in turn linked to a carbon atom. These dispersing agents must be soluble in the inert organic non-solvent suspending liquid employed and must be thermally stable at the temperatures of polymerization, which frequently are as high as 140° C.

Among the preferred dispersing agents for use in the process of the invention is chlorinated rubber, such as the product sold under the trade name "Parlon-125" which is chlorinated natural rubber containing about 65% chlorine and a viscosity of 125 centipoises in a 20% by weight solution in toluene at 25° C. Another preferred dispersing agent is chlorosulfonated polyethylene, sold under the trademark "Hypalon-20," produced by chlorosulfonating polyethylene having an average molecular weight of about 20,000 with gaseous chlorine and sulfur dioxide until the product contains 1.25% sulfur in the form of sulfonyl chloride groups and 29% chlorine. Another preferred dispersing agent is polyvinyl chloride. While the invention will be disclosed primarily in connection with these three dispersing agents, it will be recognized by those skilled in the art that other halogenated polymeric materials will provide satisfactory results and are the equivalents of these three dispersing agents. I rely upon the doctrine of equivalents to include any and all equivalents of the dispersing agent.

The dispersing agents of the present invention may be employed in low concentrations to provide their desired function in the process. An effective concentration range of 0.25% to 2.0%, preferably between about 0.25% and 1.0%, based upon weight of inert organic non-solvent suspending liquid, is sufficient to provide substantially uniformly sized beads. While higher concentrations of these agents may be employed, it had been found that larger concentrations increase the viscosity of the suspending liquid to a point which may affect the particle size distribution of the beads so as to reduce the uniformity. The optimum amount of suspending agent will vary somewhat, depending upon the rate and type of agitation, the specific organic non-solvent suspending liquid and its density, resin syrup and its viscosity and the desired bead size.

It has been found that when the dispersing agents of the present invention are employed to produce anion exchange resin beads with a predetermined stirrer speed, it is not necessary to change the stirrer speed during any part of the polymerization, and yet beads of highly uniform particle size are produced and no agglomeration of beads occurs during the polymerization. It has been found that these agents are particularly suitable for providing a particle size distribution with most of the beads falling within the desired 20 to 40 mesh size. In the case of the prior art processes employing the surface-active agents, a product having about 40 to 70% by weight of the particles falling within the 20 to 40 mesh range was usually obtained. With the dispersing agents of the present invention, about 65 to 85% by weight of the particles produced fall within the 20 to 40 mesh particle size. Furthermore, the process of the present invention has also been found to provide a very low quantity of finer particles of less than 50 mesh particle size.

Another advantage of the process of the applicant's invention, employing the halogenated long chain hydrocarbon polymers as dispersing agents, is that the dispersing agents contained in the inert organic non-solvent suspending liquid may be used repeatedly without substantial loss of dispersing agent. Thus, when employing chlorinated rubber, it has been found possible to use the same organic non-solvent liquid about 20 times and with chlorosulfonated polyethylene it has been possible to reuse the same organic non-solvent liquid for approximately 35 times. While it was necessary to add small increments of dispersing agent to the non-solvent liquid to maintain uniform viscosity, these amounts were small and the number of times which the non-solvent suspending liquid could be reused was vastly improved over the number of repeated uses permissible with the surface-active agents of the prior art. It has been found that with condensation products of long chain amides or acids with ethylene oxide, the number of repeated uses of the organic non-solvent suspending liquid is limited to about four times.

The organic non-solvent suspending liquid which may be used in the process of the present invention must be insoluble in water, thermally stable to temperatures of up to about 140° C. at least, inert to both the initial aqueous resin forming materials and their partially or final condensation products. Also, it shall desirably have a boiling point of above about 80° C., preferably above about 100° C., and have a specific gravity approximately that of the resin syrup, generally between about 1.1 and 1.5. Among the inert organic non-solvent liquids which may be employed are:

| | |
|---|---|
| Propylidene dichloride | Fluoronaphthalene |
| Trimethylenedichloride | 1-bromohexane |
| Propylenechloride | 1-bromooctane |
| 1,3-propylenedichloride | 1-bromopropane |
| Trichloroethylene | Diphenyl ether |
| 1,1,2-trichloroethane | Toluene |
| o-Dichlorobenzene | o-Xylene |
| Ethylene dichloride | m-Xylene |
| 1,2,4-trichlorobenzene | p-Xylene |
| Sym. dichloroethyl ether | 1,2,3-trimethylbenzene |
| Nitrobenzene | 1,2,4-trimethylbenzene |
| o-Nitroethylbenzene | 1,3,5-trimethylbenzene |
| o-Nitrotoluene | Ethyl benzene |
| 1,2-dimethyl-3-nitrobenzene | Isopropylbenzene |
| p-Fluorochlorobenzene | P-cymene |

The preferred non-solvent suspending medium is orthodichlorobenzene.

It is, of course, important during the process of the invention that mechanical agitation or stirring take place. The degree and type of agitation should be sufficient to keep the dispersion of aqueous syrup in organic non-solvent medium from coagulating, but not so great that extremely small size beads are obtained. Generally, stirring of between about 20–200 r.p.m. is suitable, depending upon the size of the batch. The halogenated long chain hydrocarbon polymer dispersing agents of the process of the present invention provide means of producing uniformly sized beads with a minimum of agitator control.

It is usually desirable in accordance with the process of the present invention to remove at least a portion of the water from the dispersed resin syrup in order to increase the reflux temperature of the system, particularly if the resin beads are to be cured in the non-solvent liquid. Once gelation has occurred, the resin beads are cured by heating at an elevated temperature of from about 90–130° C. until the beads are hardened.

While the process of the present invention is applicable to anion exchange resins, it is particularly suitable for producing beads of anion exchange resins produced by condensing an epihalohydrin with an alkylenepolyamine such as those resins disclosed in Dudley et al. Patent No. 2,469,683, Lundberg Patent No. 2,610,156 and my copending applications Serial Nos. 545,787 and 602,929, now Patents 2,898,309 and 2,898,310, respectively. The disclosures of these patents and copending applications are hereby incorporated by reference in their entireties.

In producing anion exchange resins by condensing an epihalohydrin with an alkylenepolyamine, it is desirable to employ at least about one mole of epihalohydrin for each mole of alkylenepolyamine.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities and percentages of materials are expressed in terms of parts by weight, unless otherwise specified. All sieve sizes are U.S. Standard Sieve Series.

EXAMPLE 1

Into a reaction vessel equipped with stirrer, thermometer and dropping funnel were placed 409 ml. of water and a mixture of 58 gms. of iminobispropylamine and 90 gms. dimethylaminopropylamine. The resulting solution was stirred and cooled to 30° C. with a surrounding ice bath. To this solution there were added dropwise 228 gms. epichlorohydrin during 1 hour keeping the temperature below 40° C. In the resulting precondensate the molar ratio of epichlorohydrin to dimethylaminopropylamine to iminobispropylamine was 2.8:1.0:0.5, respectively. Into a glass resin flask equipped with a stirrer, thermometer and distillation head were placed a suspending medium of 1200 ml. of commercial orthodichlorobenzene containing 0.5% by weight of chlorosulfonated polyethylene ("Hypalon-20"). The precondensate was poured into the suspending medium and allowed to separate. Mechanical stirring was begun at 136 r.p.m. to produce the maximum bead size distribution of between −20 and +40 mesh. The temperature of the mixture reached 105° C. and an azeotropic mixture of water and orthodichlorobenzene began to distill. Distillation was continued at 105° C. until most of the water had been removed. At this point all the beads of resin were definitely defined. The heating was continued until the temperature reached 125° C. and continued at this temperature for an additional 3 hours. The mixture was cooled and the resin beads filtered from the suspending medium. A representative sample was suspended in a saturated solution of lime in water and steam distilled with live steam for about 3 hours until all of the orthodichlorobenzene was removed. Screen analysis of this material was as follows:

9.6% held on 20 mesh sieve,
74.7% held on 40 mesh sieve,
15.7% passed through a 40 mesh sieve.

The balance of the resin was then suspended in 1 liter of lime water and introduced into a 4 liter stainless steel autoclave equipped with a propeller type agitator, a gas inlet, tube thermometer, a gas release valve and an external source of heat. The mixture was then quaternized with 153 gms. of gaseous methyl chloride at 50° C. and at 50–60 p.s.i. pressure. After the addition of the measured amount of methyl chloride the mixture was cooled and removed from the autoclave. The material was then steam distilled with live steam for 3 to 4 hours until all of the orthodichlorobenzene was removed. The material was acidified with hydrochloric acid until a pH of 3 to 4 was reached. Screen analysis of this material was as follows:

5.1% held on 20 mesh sieve,
80.8% held on 40 mesh sieve,
14.1% passed through a 40 mesh sieve.

Upon regenerating the hard translucent beads with dilute sodium hydroxide solution the quaternized resin had a basicity value of 24.0 kgr./cu. ft., an ultimate capacity of 43.0 kgr./cu. ft., a density of 298 gms./l, and an operating capacity of 26.6 kgr./cu. ft. using a regeneration dosage of 6 lbs./cu. ft. of sodium hydroxide as a 5% aqueous solution as the regenerant and an influent feed water of 200 p.p.m. free mineral acid and 17 p.p.m. of silica.

EXAMPLE 2

Using the same procedure and materials as described in Example 1, but using a stirrer speed of 148 r.p.m. in the polymerization step a polymer with the following screen analysis was obtained:

10.7% held on 20 mesh sieve,
76.0% held on 40 mesh sieve,
13.2% passed through a 40 mesh sieve.

This material when methylated with methyl chloride according to the procedure described in Example 1 was found on screen analysis to contain, after the removal of the suspending medium and acidification with hydrochloric acid, 83.5% of the particles passed through a 20 mesh sieve and held on a 40 mesh sieve.

EXAMPLE 3

The following table summarizes the screen analysis obtained in the production of polymeric beads using the same method and materials as described in Example 1 with a stirrer speed during the polymerization of 140 r.p.m. The only variation was to change the concentration of the Hypalon in order to determine the particle size distribution of the polymer:

| Resin No. | Percent "Hypalon" Based on Weight of orthodichlorobenzene | Percent Held on 20 mesh sieve | Percent Held on 40 mesh sieve | Percent Passing thru 40 mesh sieve |
|---|---|---|---|---|
| 1 | 1.0 | 16.2 | 67.7 | 16.6 |
| 2 | 0.5 | 17.5 | 71.1 | 12.4 |
| 3 | 0.25 | 18.7 | 68.3 | 13.0 |
| 4 | 0.1 | [1] 57.5 | 39.6 | 2.0 |

[1] Some agglomeration.

EXAMPLE 4

Into a reaction vessel equipped with a stirrer, thermometer and dropping funnel were placed about 318 ml. of water and a mixture of 48 gms. of iminobispropylamine and 75 gms. of dimethylaminopropylamine. The resulting solution was stirred and cooled to 30° C. using a surrounding ice bath. To this solution there was added dropwise 169 gms. of epichlorohydrin during 1 hour keeping the temperature below 40° C. In the resulting precondensate the molar ratio of epichlorohydrin to dimethylaminopropylamine to iminobispropylamine was 2.5:1.0:0.5 respectively. Into a glass resin flask equipped with a stirrer, thermometer, distillation head were placed a suspending medium of 1400 ml. of commercial orthodichlorobenzene containing 1% by weight of chlorinated rubber ("Parlon–125"). The precondensate was poured into the suspending medium and allowed to separate. Mechanical stirring was begun at 170 r.p.m. to produce the maximum size distribution of between −20 +40 mesh. The mixture was heated with a surrounding oil bath. When the mixture reached 105° C. an azeotropic mixture of water and ortho-dichlorobenzene began to distill. Distillation was continued at 105° C. until most of the water had been removed. At this point all of the beads were definitely defined. The heating was continued until the temperature reached 125° C. and continued at this temperature for an additional 3 hours. The mixture was cooled, the resin beads filtered from the suspending medium and the resin beads then suspended into a liter of water containing 150 gms. of commercial lime. The mixture was then steam distilled with live steam for about 3–4 hours until all of the ortho-dichlorobenzene was removed. The entire mixture of the resin beads and lime water was then introduced into a 4-liter stainless steel autoclave equipped with a propeller-type agitator, a gas inlet tube, thermometer, a gas release valve and an external source of heat. The mixture was then quaternized with 135 gms. of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, with dilute sodium hydroxide solution, the quaternized resin had a basicity value of 26.8 kgr./cu. ft.; an ultimate capacity of 42 kgr./cu. ft.; a density of 320 grams/liter; and an operating capacity of 24.0 kgr./cu. ft. using a regeneration dosage of 6 lbs./cu. ft. of sodium hydroxide as a 5% aqueous solution as the regenerant and an influent feed water of 200 p.p.m. free mineral acid and 17 p.p.m. of silica. The screen size distribution was 0% was held on a 20 mesh sieve, 69.9% was held on a 40 mesh sieve and 30.1% passed through a 40 mesh sieve.

EXAMPLE 5

Into a suitable flask equipped with an agitator, cooling bath and thermometer, 544 parts of water were added followed by 226 parts of tetraethylenepentamine. The resulting solution was cooled to 10° C., and 296 parts of epichlorohydrin were added over a period of two hours, maintaining the temperature between 10 and 20° C. After the addition of the epichlorohydrin, the entire mixture was suspended in 2400 ml. of ortho-dichlorobenzene containing 0.5% chlorinated rubber ("Parlon–125") based on the weight of ortho-dichlorobenzene. The mixture was heated to 105 to 110° C. until no further azeotrope of water and ortho-dichlorobenzene was formed. Additional heating at 125° C. for three hours followed. The mixture was cooled and the resulting beads were filtered from the ortho-dichlorobenzene and then steam distilled in the presence of a saturated solution of lime in water to remove any remaining ortho-dichlorobenzene. The basicity of the resin was 4.5 kgr./cu. ft.; an ultimate capacity of 45 kgr./cu. ft. and an operating capacity of 25.4 kgr./cu. ft. using a regenerating dosage of 3.2 lbs. of 5% NaOH solution and a feed water of 200 p.p.m. FMA water. The screen analysis of the resin was 3.0% was held on a 20 mesh sieve, 68.7% was held on a 40 mesh sieve, and 28.3% passed through a 40 mesh sieve.

EXAMPLE 6

Into a reaction vessel equipped with a stirrer, thermometer and dropping funnel were placed 318 ml. of water and about 123.5 grams of dimethylaminopropylamine. The resulting mixture was stirred and cooled to 30° C. with a surrounding ice bath. To this solution there were added dropwise about 168.5 grams of epichlorohydrin during 45 minutes keeping the temperature below 40° C. The molar ratio of epichlorohydrin to dimethylaminopropylamine was 1.5:1. Into a glass resin flask equipped with a stirrer, thermomenter and distillation head were placed 1400 ml. of commercial ortho-dichlorobenzene containing 1% by weight of chlorinated rubber ("Parlon–125"). The previously prepared condensate was poured into this suspending medium and allowed to separate. Mechanical stirring was begun at a previously defined stirrer speed to produce a maximum size distribution of between −30 and +50 mesh. The mixture was heated with a surrounding oil bath. When the temperature reached 105° C. an azeotropic mixture of water and ortho-dichlorobenzene began to distil. Distillation was continued at 105° C. until most of the water had been removed. At this point all of the beads were well defined. Heating was continued until the temperature reached 125° C. and continued at this temperature for an additional 3 hours. The mixture was cooled, the resin beads filtered from the suspending medium and then suspended into a liter of water containing 150 grams of commercial lime. The mixture was then steam distilled with live steam for about 3–4 hours until all of the ortho-dichlorobenzene was removed. The material was washed with water to remove all of the lime. Upon regenerating the hard transparent beads, whose screen size was such that approximately 95% by volume was retained on 40 mesh screen, with dilute aqueous sodium hydroxide solution, the product was found to have a basicity value of 18.5 kgr./cu. ft.; an ultimate capacity of 44.7 kgr./cu. ft.; a density of 290 grams/liter and an operating capacity of 18.3 kgr./cu. ft. using a regeneration dosage of 6 lbs./cu. ft. of sodium hydroxide as a 5% aqueous solution.

EXAMPLE 7

Employing the same procedure as in Example 6 but using 119 grams of dimethylaminopropylamine in 318 ml. of water and using 175 grams of epichlorohydrin, a precondensate syrup was prepared. The molar ratio of epichlorohydrin to dimethylaminopropylamine was 1.6:1. The entire precondensate syrup was added to 1400 ml. of commercial ortho-dichlorobenzene which contained 1% by weight of chlorinated rubber ("Parlon–125") and a resin was obtained as described in Example 6. The resin beads which were obtained had a basicity value of 20.3 kgr./cu. ft.; an ultimate capacity of 34.6 kgr./cu. ft.; and a density of 298 grams/liter. The operating capacity was found to be 22.9 kgr./cu. ft. when employing a regeneration solution containing 6 pounds of sodium hydroxide as a 5% aqueous solution for each cubic foot of resin with influent water containing 200 p.p.m. of free mineral acids and 17 p.p.m. of silica.

EXAMPLE 8

Into a reaction vessel equipped with a stirrer, thermometer and dropping funnel were placed about 318 ml. of water and a mixture of 48 grams of iminobispropylamine and 75 grams of dimethylaminopropylamine. The resulting solution was stirred and cooled to 30° C. using a surrounding ice bath. To this solution there was added dropwise 169 grams of epichlorohydrin during 1 hour keeping the temperature below 40° C. The molar ratio of epichlorohydrin to dimethylaminopropylamine to iminobisproylamine was 2.5:1.0:0.5, respectively. Into a glass resin flask equipped with a stirrer, thermometer, distillation head were placed 1400 ml. of commercial ortho-dichlorobenzene containing 1% by weight of chlorinated rubber ("Parlon–125"). The previously prepared condensate was poured into the suspending medium and allowed to separate. Mechanical stirring was begun at 170 r.p.m. to produce the maximum size distribution of between −30 and +50 mesh. The mixture was heated with a surrounding oil bath. When the mixture reached 105° C. an azeotropic mixture of water and ortho-dichlorobenzene began to distill. Distillation was continued at 105° C. until most of the water had been removed. At this point all of the beads were definitely defined. The heating was continued until the temperature reached 125° C. and continued at this temperature for an additional 3 hours. The mixture was cooled, the resin beads filtered from the suspending medium and the resin beads then suspended into a liter of water containing 150 grams of commercial lime. The mixture was then steam distilled with live steam for about 3–4 hours until all of the ortho-dichlorobenzene was removed. The entire mixture of the resin beads and lime water was then introduced into a 4-liter stainless steel autoclave equipped with a propeller-type agitator, a gas inlet tube, thermometer, a gas release valve and an external source of heat. The mixture was then quaternized with 135 grams of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, the screen size being such that approximately 95% by volume was retained on a 40-mesh screen, with dilute sodium hydroxide solution, the quaternized resin had a basicity value of 26.8 kgr./cu. ft.; an ultimate capacity of 42 kgr./cu. ft.; a density of 320 grams/liter; and an operating capacity of 24.0 kgr./cu. ft. using a regeneration dosage of 6 lbs./cu. ft. of sodium hydroxide as a 5% aqueous solution as the regenerant and an influent feed water of 200 p.p.m. free mineral acid and 17 p.p.m. of silica.

EXAMPLE 9

Into a reaction vessel equipped with a stirrer, thermometer and a dropping funnel were placed 128 ml. of water and 49.5 grams of dimethylaminopropylamine. The resulting mixture was stirred and cooled to 30° C. by means of a surrounding ice bath. To this solution there were added dropwise about 100 grams of epibromohydrin during 45 minutes keeping the temperature below 40° C. The molar ratio of epibromohydrin to dimethylaminopropylamine was 1.5:1. Into a glass resin flask equipped with a stirrer, thermometer and distillation head were placed 563 ml. of commercial ortho-dichlorobenzene containing 1% by weight of chlorinated rubber ("Parlon–

125"). The previously prepared condensate was poured into the suspending medium and allowed to separate. Mechanical stirring was begun at approximately 200 r.p.m. to produce the maximum size distribution of between —30 and +50 mesh. The mixture was heated with a surrounding oil bath. When the temperature reached 105° C., an azeotropic mixture of water and ortho-dichlorobenzene began to distill. Distillation was continued at 105° C. until most of the water had been removed. At this point all of the beads had been well defined. Heating was continued until the temperature reached 125° C. and continued at this temperature for an additional 3 hours. The mixture was cooled, the resin beads filtered from the suspending medium and then suspended into 500 ml. of water containing 75 grams of commercial lime. The mixture was then steam distilled with live steam for about 3–4 hours until all of the ortho-dichlorobenzene was removed. The entire mixture of the resin beads and lime water was then introduced into a 4-liter stainless steel autoclave equipped with a propeller type agitator, gas inlet tube, thermometer, gas release valve and exterior source of heat. The mixture was then quaternized with 117 grams of gaseous methyl chloride at 50° C. and at 50–60 p.s.i. pressure. After the addition of the measured amount of methyl chloride, the mixture was cooled and removed from the autoclave. The material was acidified with hydrochloric acid until a pH of 3–4 was reached. Upon regenerating the hard translucent beads, whose screen size was such that 95% by volume was retained on +40 mesh screen, with dilute sodium hydroxide solution, the quaternized resin had a basicity value of 20.0 kgr./cu. ft.; an ultimate capacity of 33.1 kgr./cu. ft.; a density of 330 grams/liter; and an operating capacity of 24.0 kgr./cu. ft. with a regeneration dosage of 6 lbs. of sodium hydroxide for each cubic ft. of resin as a 5% aqueous solution and influent feed water of 200 p.p.m. free mineral acid and 17 p.p.m. of silica.

EXAMPLE 10

A. *Preparation of resin beads*

Into a three-neck flask equipped with a stirrer, thermometer, and dropping funnel were placed about 636 ml. of water and 152 grams of commercial iminobispropylamine and 133 grams of 2,5-dimethyl piperazine. The resulting solution was stirred and cooled to 30° C. with a surrounding ice bath. To this solution there was added dropwise 299 grams of epichlorohydrin during 45 minutes keeping the temperature below 40° C. The molar ratio of epichlorohydrin to iminobispropylamine to 2,5-dimethyl piperazine was 2.8:1:1. Into a two liter glass resin flask equipped with a stirrer, thermometer and distillation head were placed 2800 ml. of commercial ortho-dichlorobenzene containing 1% by weight of chlorinated rubber ("Parlon–125"). The previously prepared condensate was poured into the suspending medium and allowed to separate. Mechanical stirring was begun at a previously determined stirrer speed to produce a maximum size distribution of between —30 +50 mesh. The mixture was heated with a surrounding oil bath. When the temperature reached 105° C., an azeotropic mixture of water and ortho-dichlorobenzene began to distill. Distillation was continued at 105° C. until most of the water had been removed. At this point all of the beads were definitely well defined. The heating was continued until the temperature reached 125° C. and continued at this temperature for an additional 3 hours. The mixture was cooled, the resin beads filtered from the suspending medium and the resin beads then suspended into a liter of water containing 150 g. of commercial lime. The mixture was then steam distilled with live steam for about 3–4 hours until all of the ortho-dichlorobenzene was removed.

B. *Preparation of quaternized anion exchange resin beads*

The entire mixture produced in part A was then introduced into a 4-liter stainless steel autoclave equipped with a propeller agitator, a gas inlet tube, a thermometer, a gas release valve and an external source of heat. The mixture was then methylated with 290 grams of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, whose screen size was such that approximately 95% by weight was retained on a 40 mesh screen, with dilute sodium hydroxide solution the resin had a basicity of 21.0 kgr./cu. ft.; an ultimate capacity of 33.5 kgr./cu. ft.; a density of 267 grams/liter and an operating capacity of 27.5 kgr./cu. ft. with a regeneration dosage of 6 lbs./cu. ft. of sodium hydroxide as a 5% aqueous solution.

EXAMPLE 11

A. *Preparation of resin beads*

Into a three-neck flask equipped with a stirrer, thermometer, and dropping funnel were placed 318 ml. of water and about 86.5 grams of commercial iminobispropylamine and 31 grams of commercial grade "mixed" picoline. The resulting solution was stirred and cooled to 30° C. with a surrounding ice bath. To this solution there was added dropwise 173 grams of epichlorohydrin during 45 minutes keeping the temperature below 40° C. The molar ratio of epichlorohydrin to iminobispropylamine to mixed picoline was 2.8:1:0.5. Into a two liter glass resin flask equipped with a stirrer, thermometer and distillation head were placed 2800 ml. of commercial ortho-dichlorobenzene containing 1% by weight of chlorinated rubber ("Parlon–125"). The previously prepared condensate was poured into this suspending medium and allowed to separate. Mechanical stirring was begun at a previously defined stirrer speed to produce a maximum size distribution of between —30 +50 mesh. The mixture was heated with a surrounding oil bath. When the temperature reached 105° C. an azeotropic mixture of water and ortho-dichlorobenzene began to distill. Distillation was continued at 105° C. until most of the water had been removed. At this point all of the beads were definitely well defined. The heating was continued until the temperature reached 125° C. and continued at this temperature for an additional 3 hours. The mixture was cooled, the resin beads filtered from the suspending medium and the resin beads then suspended into a liter of water containing 150 g. of commercial lime. The mixture was then steam distilled with live steam for about 3–4 hours until all of the ortho-dichlorobenzene was removed.

B. *Preparation of quaternized anion exchange resin beads*

The entire mixture produced in part A was then introduced into a 4-liter stainless steel autoclave equipped with a propeller agitator, a gas inlet tube, a thermometer, a gas release valve and an external source of heat. The mixture was then methylated with 135 grams of gaseous methyl chloride at 50° C. and at 50–60 p.s.i. pressure. After the addition of the measured amount of methyl chloride the mixture was cooled and removed from the autoclave. The material was acidified with hydrochloric acid until a pH of 3–4 was reached. Upon regenerating the hard translucent beads, whose screen size was such that approximately 95% by weight was retained on a 40 mesh screen, with dilute sodium hydroxide solution the resin had a basicity of 26.2 kgr./cu. ft.; an ultimate capacity of 49.9 kgr./cu. ft.; a density of 437 grams/liter and an operating capacity of 27.0 kgr./cu. ft. with a regeneration dosage of 6 lbs./cu. ft. of sodium hydroxide as a 5% solution.

As will be apparent to those skilled in the art, other halogenated long chain hydrocarbon polymers may be used as suspending agents in the foregoing examples. Thus polyvinyl chloride may be employed. Other ion exchange resins, both anion and cation, may be prepared in accordance with these foregoing examples. Of course, other inert organic non-solvent liquids, such as those listed hereinabove may be employed.

Certain data are given for the products prepared in some of the above examples which are of value in assessing the usefulness of highly-basic anion exchange resins. The methods used for determining those values which are not the subject of standardized tests are those described in my copending application, Serial No. 602,929, now Patent No. 2,898,310.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A process for producing anion exchange resin beads which comprises dispersing an aqueous syrup of a partial condensate of an epihalohydrin and an alkylenepolyamine in an inert organic non-solvent suspending liquid with mechanical agitation in the presence of a dispersing agent selected from the class consisting of chlorinated rubber, chlorosulfonated polyethylene and polyvinyl chloride, maintaining the resulting dispersion at an elevated temperature until the resin gels, and finally curing the gelled resin by heating.

2. A process as defined by claim 1 in which the inert non-solvent suspending liquid is a chlorinated hydrocarbon.

3. A process as defined by claim 1 in which the inert non-solvent suspending liquid is ortho-dichlorobenzene.

4. A process as defined by claim 1 wherein the dispersing agent is chlorinated rubber.

5. A process as defined by claim 1 wherein the dispersing agent is chlorosulfonated polyethylene.

6. A process as defined by claim 1 wherein the dispersing agent is polyvinyl chloride.

7. A process as defined by claim 1 wherein the amount of dispersing agent comprises between about 0.25 and 2% by weight of the inert organic non-solvent suspending liquid.

8. A process as defined by claim 1 wherein the epihalohydrin with an alkylenepolyamine are employed in a molecular weight ratio of at least about 1 to 1, respectively.

9. A process as defined by claim 1 wherein the condensate is produced from epichlorohydrin with an alkylenepolyamine employed in a molecular weight ratio of at least about 1 to 1, respectively.

References Cited in the file of this patent

UNITED STATES PATENTS

| | | |
|---|---|---|
| 2,281,567 | Ellingboe | May 5, 1942 |
| 2,898,310 | Greer | Aug. 4, 1959 |